Feb. 10, 1942. P. SARTORI 2,272,954
CHEESE-CURD MACHINE
Filed Oct. 1, 1940 2 Sheets-Sheet 2
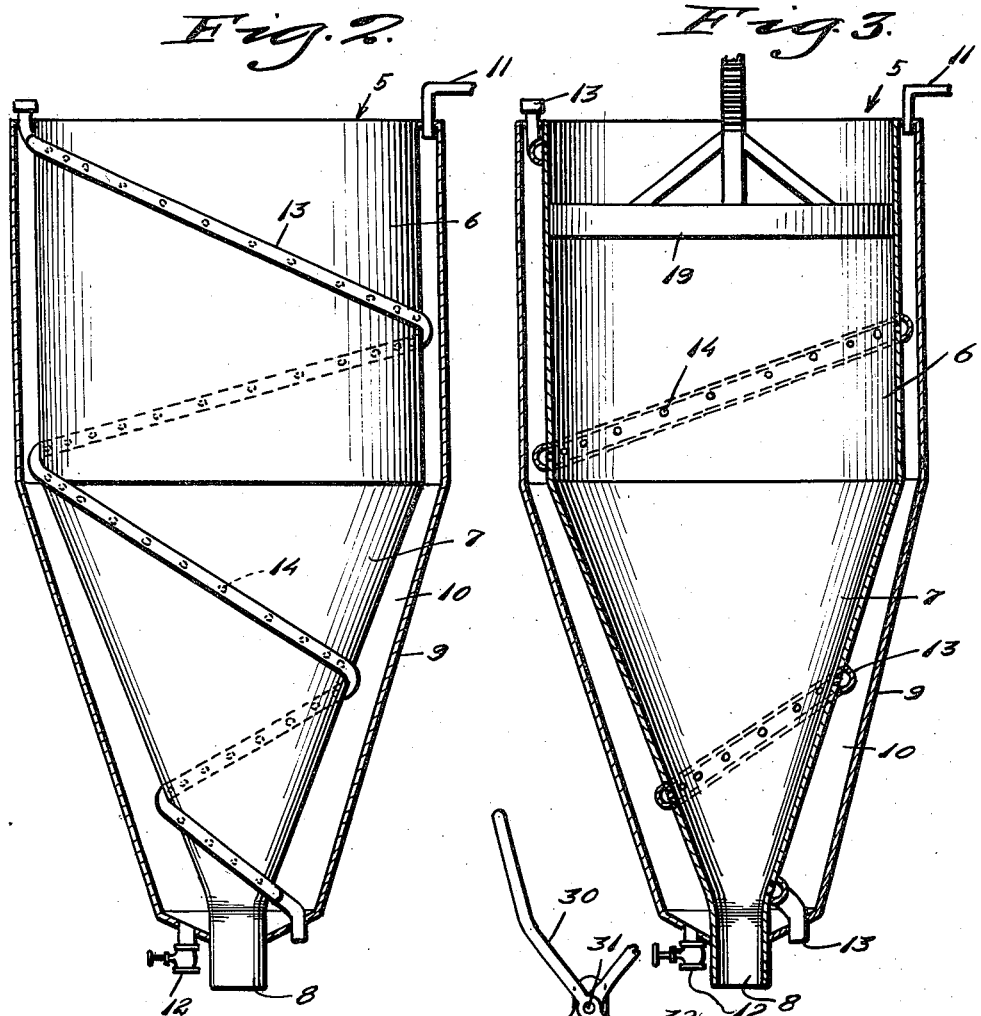
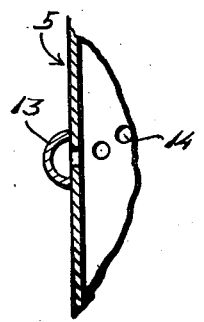
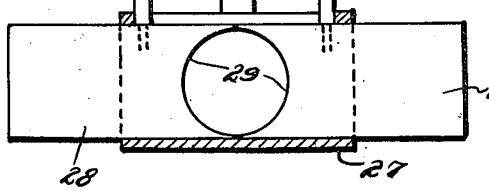
Inventor
Paul Sartori Patented Feb. 10, 1942

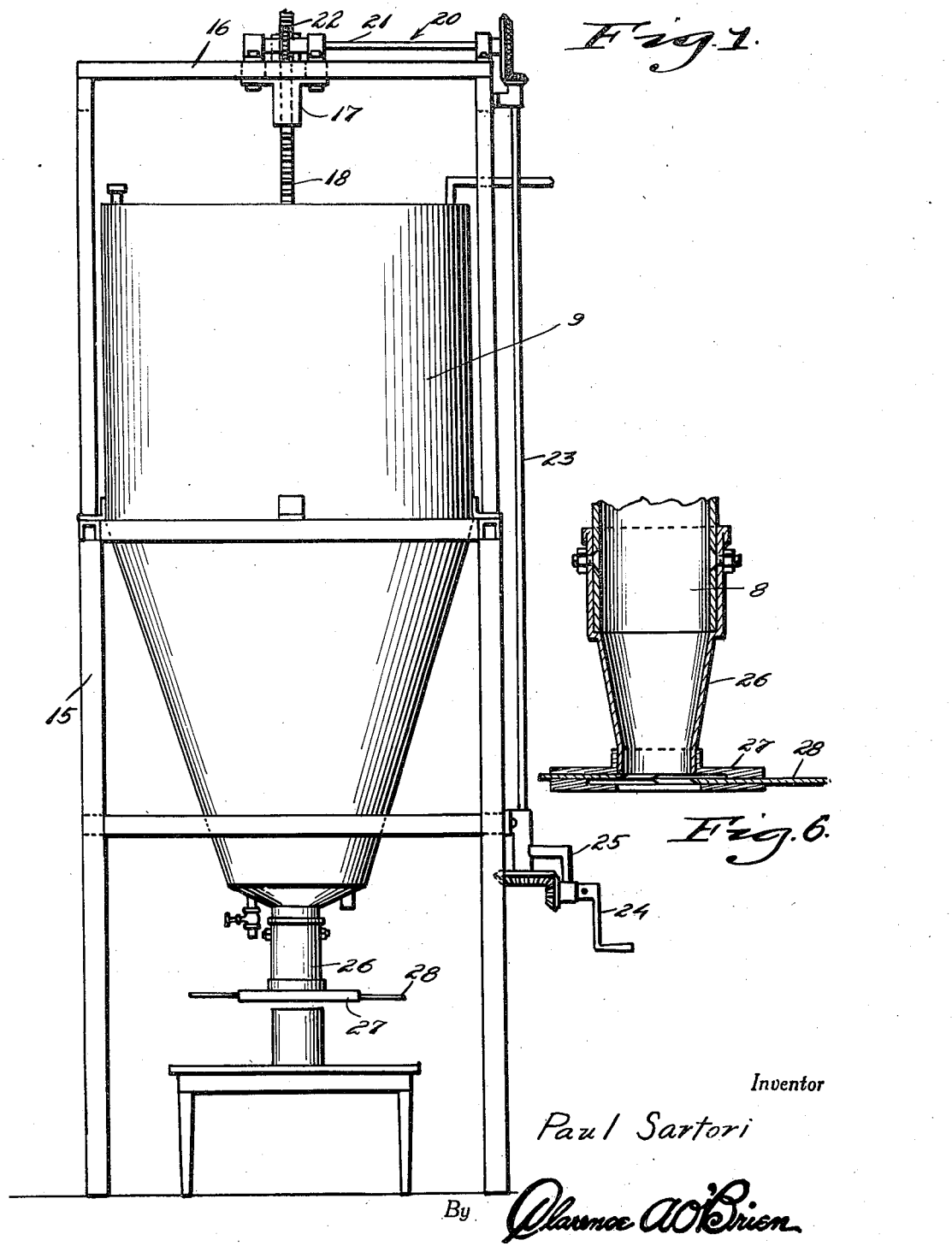

2,272,954

UNITED STATES PATENT OFFICE 2,272,954

CHEESE-CURD MACHINE

Paul Sartori, Plymouth, Wis.

Application October 1, 1940, Serial No. 359,279

2 Claims. (Cl. 31—46)

This invention relates to a cheese curd machine especially adapted for efficiently and rapidly matting and moulding cheese curd with the use of man power reduced to a minimum. The primary object of the invention is to provide a device which is extremely simple in construction and operation and one which will place the cheese curd under desired pressure to remove surplus moisture therefrom and at the same time mat the curd and mould the latter into selected shape and permit cutting of the moulded curd into desired lengths. Through the use of this device the customary practice of matting and moulding the curd by hand is eliminated and produces a more satisfactory product in much less time and at a lower cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a side elevation illustrating a cheese curd machine constructed in accordance with my invention.

Figure 2 is a fragmentary vertical sectional view showing the hopper and moulding neck of the machine with the hopper water jacketed for heating the contents thereof to a desired temperature.

Figure 3 is a view similar to Figure 2 showing the interior construction of the hopper and the presser plate operating therein.

Figure 4 is a detail sectional view illustrating the means of permitting excess moisture to escape from the curd when under pressure.

Figure 5 is a detail sectional view illustrating a cutting mechanism for cutting the moulded curd into desired lengths.

Figure 6 is a vertical sectional view illustrating the moulding neck and cutter associated therewith.

Referring in detail to the drawings, the numeral 5 indicates a hopper in which cheese curd may be placed after being properly heated, amalgamated and spun and includes a cylindrical portion 6 and a funnel-shaped portion 7 terminating in a discharge neck 8. The portions 6 and 7 are of integral construction.

Surrounding the hopper and spaced therefrom is a jacket 9 forming a water space 10 for receiving hot water to sustain the heated curd at a desired temperature. The upper and lower ends of the jacket 9 are formed onto the hopper and water at a desired temperature may be admitted to the space 10 by a pipe 11 while water may be drained from the space 10 by the opening of the valve 12.

A substantially half round tube 13 of spiral formation is formed on the exterior walls of the hopper and the latter is provided with perforations 14 in the walls which place the interior of the hopper in communication with the tube. The lower end of the tube opens outwardly through the bottom wall of the jacket 9, while the upper end of the tube opens to the atmosphere at the upper end of the jacket.

The jacket and hopper are mounted on a suitable supporting structure 15 including a cross head 16 carrying a guide 17 in which is slidably mounted a rack bar 18. The rack bar is secured onto a presser plate 19 operating within the hopper for the purpose of placing the cheese curd in the hopper under a desired pressure.

An operating means 20 is connected with the rack bar and is carried by the supporting structure 15 for imparting motion to the presser plate in opposite directions and consists of a shaft 21 journaled on the cross head 16 and geared to the rack bar 18, as shown at 22. A shaft 23 is journaled on the supporting structure 15 and is geared to the shaft 21 and to a crank handle 24. The crank handle is journaled in a bracket 25 forming a part of one of the journals for the shaft 23 and so positions the crank handle that it can be conveniently rotated by a person standing adjacent the discharge neck 8 of the hopper.

The discharge neck 8 may be of different selected shapes for forming the cheese curd into a selected form and has mounted thereon a cutter-carrying sleeve 26. Supporting plates 27 are carried by the outlet end of the sleeve 26 and slidably support knife blades 28 having semicircular recesses 29 in the adjacent ends. The cutting blades 28 are adapted to slide one over the other for the purpose of severing the cheese curd as it leaves the sleeve 26 in desired lengths and at the same time close the sleeve 26 against the escape of further cheese curd therefrom. When the knife blades are slid apart they open the sleeve 26 so that the cheese curd under pressure may escape from the sleeve 26 and the operator may again operate the blades into overlapping relation to cut the curd into the desired length. Suitable hand levers 30 are pivotally mounted, as shown at 31, and connected by pivots and links 32 to the knife blades for imparting reciprocal motion thereto. While this specific way of operating the blades is shown in the drawings it is to be understood that other means may be provided for imparting reciprocal motion to the blades.

It is to be understood that when the heated and properly mixed cheese curd is placed in the hopper it is subjected to a desired pressure for the purpose of expelling therefrom excess moisture. This moisture escapes from the hopper by way of the perforations 14 and the tube 13. The cheese also being placed under pressure as specified forces the curd through the neck 8 and sleeve 26 when the cutter blades are moved apart, as shown in Figure 5, and when curd of a sufficient length has left the sleeve 26 the blades are operated in overlapping relation to sever the curd.

Also, it is to be understood that, while one specific type of means is shown and described for reciprocating the presser plate 19, other means may be provided if desired, and further that the device may be so arranged to employ dual hoppers with a single presser capable of movement into and out of either of the hoppers, so that one hopper may be filled while the other hopper is being employed for matting and moulding the cheese curd.

While I have shown and described the preferred embodiment of my invention, it will be understood that minor changes in construction, combination and arrangement of parts may be made without departing from the spirit and scope of the invention as claimed.

Having thus described the invention, what I claim is:

1. In a device of the character described, a hopper including a funnel-shaped portion terminating at one end in a discharge neck of a selected shape and a cylindrical portion integral with the other end of the funnel-shaped portion, a jacket surrounding the hopper and spaced therefrom to form a water space to receive water at a desired temperature for keeping cheese curd within the hopper at a desired temperature, means for admitting water to the water space, means for permitting water to escape from said space, and means on the outer wall of the hopper and extending outwardly of the jacket and having direct communication with the interior of said hopper for permitting moisture to escape from the cheese curd within said hopper.

2. In a device of the character described, a hopper including a funnel-shaped portion terminating at one end in a discharge neck of a selected shape and a cylindrical portion integral with the other end of the funnel-shaped portion, a jacket surrounding the hopper and spaced therefrom to form a water space to receive water at a desired temperature for keeping cheese curd within the hopper at a desired temperature, means for admitting water to the water space, means for permitting water to escape from said space, and a half round spirally formed tube formed on the exterior wall of the hopper within the jacket and having its ends extending exteriorly of said jacket, said hopper having perforations in the walls thereof connecting the interior of the hopper with the tube.

PAUL SARTORI.